United States Patent
Sultan et al.

(10) Patent No.: US 7,383,354 B2
(45) Date of Patent: Jun. 3, 2008

(54) SPATIAL REUSE AND MULTI-POINT INTERCONNECTION IN BRIDGE-INTERCONNECTED RING NETWORKS

(75) Inventors: Robert Sultan, Katonah, NY (US); Ajay Sahai, Shrewsbury, MA (US); Sushil Pandhi, Mahwah, NJ (US)

(73) Assignee: Fujitsu Limited, Kanagawa-ken (JP)

( * ) Notice: Subject to any disclaimer, the term of this patent is extended or adjusted under 35 U.S.C. 154(b) by 691 days.

(21) Appl. No.: 10/074,600

(22) Filed: Feb. 12, 2002

(65) Prior Publication Data

US 2003/0154315 A1    Aug. 14, 2003

(51) Int. Cl.
*G06F 15/16* (2006.01)
*G06F 15/173* (2006.01)

(52) U.S. Cl. ............... 709/245; 709/238; 709/240; 709/246

(58) Field of Classification Search ............... 709/238, 709/242–245, 249–252, 240, 246; 370/225, 370/336

See application file for complete search history.

(56) References Cited

U.S. PATENT DOCUMENTS

| | | | |
|---|---|---|---|
| 5,018,133 A | 5/1991 | Tsukakoshi et al. | 370/16 |
| 5,140,586 A * | 8/1992 | Kloper et al. | 370/216 |
| 5,168,496 A | 12/1992 | Ohba et al. | 370/85.14 |
| 5,239,673 A * | 8/1993 | Natarajan | 455/426.1 |
| 5,301,185 A | 4/1994 | Cherry | 370/16.1 |
| 5,379,291 A * | 1/1995 | Herzberg et al. | 370/404 |
| 5,491,686 A | 2/1996 | Sato | 370/16.1 |
| 5,515,537 A * | 5/1996 | Tavares et al. | 710/244 |
| 5,638,515 A | 6/1997 | Futral | 395/200.11 |
| 5,734,824 A | 3/1998 | Choi | 395/200.11 |
| 5,884,043 A | 3/1999 | Teplitsky | 395/200.68 |
| 5,890,001 A * | 3/1999 | Hall | 710/240 |
| 5,898,686 A | 4/1999 | Virgile | 370/381 |
| 5,978,379 A | 11/1999 | Chan et al. | 370/403 |

(Continued)

OTHER PUBLICATIONS

Wai-Chau Hui et al., "RPR Bridging—Packet Walkthroughs", Presentation to IEEE 802.17, retrieved from http://grouper/ieee.org/groups/802/17/documents/presentations (Jul. 2001).

(Continued)

*Primary Examiner*—Ario Etienne
*Assistant Examiner*—Hussein A El Chanti
(74) *Attorney, Agent, or Firm*—Weingarten, Schurgin, Gagnebin & Lebovici LLP

(57) ABSTRACT

A data communications network includes a ring configured for spatial reuse, such as a resilient packet ring. A first bridge is coupled to the ring and to an end station such as an interworking bridge or router. A second bridge coupled to the ring learns an association between the first bridge and the end station by monitoring packets originated in the network by the end station and sent on the ring by the first bridge. The second bridge learns the association by obtaining an identifier of the first bridge and an address of the end station from received packets. When the second bridge receives packets destined for the end station, the packets are forwarded as broadcast transmissions on the ring if the association between the first bridge and the end station has not yet been learned, and are forwarded as unicast transmissions to the first bridge on the ring if the association between the first bridge and the end station has been learned.

14 Claims, 3 Drawing Sheets

U.S. PATENT DOCUMENTS

| | | | |
|---|---|---|---|
| 5,982,745 A | 11/1999 | Wolff et al. | 370/219 |
| 6,006,330 A * | 12/1999 | Soni | 713/201 |
| 6,064,675 A | 5/2000 | Alexander, Jr. et al. | 370/401 |
| 6,172,982 B1 * | 1/2001 | Ishii et al. | 370/401 |
| 6,178,171 B1 | 1/2001 | Alexander, Jr. et al. | 370/395 |
| 6,198,747 B1 | 3/2001 | Bingham et al. | 370/401 |
| 6,219,739 B1 | 4/2001 | Dutt et al. | 710/129 |
| 6,304,575 B1 | 10/2001 | Carroll et al. | 370/408 |
| 6,304,901 B1 | 10/2001 | McCloghrie et al. | 709/221 |
| 6,331,985 B1 * | 12/2001 | Coden | 370/403 |
| 6,446,131 B1 * | 9/2002 | Khansari et al. | 709/238 |
| 6,553,508 B1 * | 4/2003 | Minyard | 714/4 |
| 6,567,410 B1 * | 5/2003 | Perlman | 370/401 |
| 6,598,092 B2 * | 7/2003 | Tomizawa et al. | 709/251 |
| 6,728,220 B2 * | 4/2004 | Behzadi | 370/254 |
| 6,765,881 B1 * | 7/2004 | Rajakarunanayake | 370/256 |
| 6,816,490 B1 * | 11/2004 | Chung | 370/392 |
| 7,027,453 B2 * | 4/2006 | Lui et al. | 370/408 |
| 7,171,504 B2 * | 1/2007 | Ishii | 710/305 |

OTHER PUBLICATIONS

Jim Kao et al., "Bridging Over RPR", Presentation to IEEE 802.17, retrieved from http://grouper/ieee.org/groups/802/17/documents/presentations (Jul. 2001).

Yong Kim, "RPR and 802.1D Bridging Issues", Presentation to IEEE 802.17, retrieved from http://grouper/ieee.org/groups/802/17/documents/presentations (May 2001).

Robert Castellano et al., "802.17 Bridging", Presentation to IEEE 802.17, retrieved from http://grouper/ieee.org/groups/802/17/documents/presentations (Nov. 2001).

Marc Holness et al., "802.17 MAC Compatibility With 802.1D/Q", Presentation to IEEE 802.17, retrieved from http://grouper/ieee.org/groups/802/17/documents/presentations (Nov. 2001).

Whatis.com, entry for "Resilient Packet Ring".

D. Tsiang et al., "The Cisco SRP MAC Layer Protocol", Network Working Group, retrieved from http://www.ietf.cnri.reston.va.us/rfc/rfc2892.txt?number=2892 (Aug. 2000).

Resilient Packet Ring Alliance, "An Introduction to Resilient Packet Ring Technology", retrieved from www.rpralliance.org (Oct. 2001).

Nigel Cole et al., "Resilient Packet Rings for Metro Networks", Network Types Metro/Local Networks (FTTH), pp. 142-146, date unknown.

* cited by examiner

SPATIAL REUSE AND MULTI-POINT INTERCONNECTION IN BRIDGE-INTERCONNECTED RING NETWORKS

CROSS REFERENCE TO RELATED APPLICATIONS

None

STATEMENT REGARDING FEDERALLY SPONSORED RESEARCH OR DEVELOPMENT

Not Applicable

BACKGROUND OF THE INVENTION

The present invention is related to the field of data communications networks, and more particularly to networks employing ring architectures.

Ring architectures have been used in data communications networks to further certain operational goals such as improved availability. Ring networks have traditionally incorporated protection features that allow for continued operation even in the presence of some failures. Ring networks based on Synchronous Optical Network (SONET) standards, for example, have employed redundant, counter-rotating fiber rings along with mechanisms for routing working and protect traffic on the rings so as to enable the network to withstand some failures. More recently, a packet-based ring architecture referred to as Resilient Packet Ring (RPR) is emerging.

One desirable characteristic of RPR rings not generally found in prior rings, such as those based on SONET or the Fiber Distributed Data Interchange (FDDI) standard, is referred to as "spatial reuse". This term refers to the ability to send unicast transmissions between two distinct points on the ring, rather than requiring each transmission to circulate around the entire ring. In traditional packet rings such as FDDI rings, packets are circulated around the entire ring and stripped from the ring when received back at the source node. In contrast, RPR rings employ destination stripping, so that unicast packets generally traverse only the portion of the ring extending between source and destination nodes. This enables the use of the remaining portion of the ring for other transmissions, resulting in generally higher network performance.

It has been known to use network devices referred to as "bridges" to link together multiple subnetworks to create a larger network. One area of traditional use for bridges has been in Ethernet local area networks. It has also been known to use bridges to link different rings, such as FDDI rings, together. Bridges generally operate at layer two of the seven-layer Open Systems Interconnection (OSI) model, which is the same layer at which many LAN and ring protocols are also defined. In particular, bridges are responsible for forwarding layer-2 data packets from one segment or subnetwork to one or more other segments or subnetworks. In some networks, such as Ethernet networks, bridges may include an address learning mechanism by which the bridge comes to know where at least some nodes are located. Packets destined for such known nodes can be forwarded using targeted "unicast" transmission. A bridge may also carry out this forwarding using "broadcast" transmission techniques, in which packets are transmitted on segments in a manner indicating that the packet should be examined by all nodes on each segment, because the location of the destination node is not known to the bridge. Transmission in FDDI rings, for example, always has a broadcast characteristic, because each packet is transmitted around the entire ring and examined at each node.

A potential problem with bridged rings is the need to transmit packets in a broadcast fashion when the destination node for a packet resides on a "remote" ring, i.e., a ring to which a bridge receiving the packet is not connected. Because broadcast transmissions must circulate entirely around a ring, they tend to reduce the degree to which spatial reuse can be exploited, and therefore tend to reduce the data-carrying capacity of the ring from what might otherwise be achieved. It would be desirable to provide for bridging of packet rings in a manner that helps preserve spatial reuse and thereby tends to maximize the data carrying capacity of the rings.

BRIEF SUMMARY OF THE INVENTION

In accordance with the present invention, a data communications network is disclosed that includes a ring with attached bridges that operate in a manner tending to preserve spatial reuse of the ring. The advantages of bridging can be achieved along with higher overall data carrying capacity than in prior bridged ring networks.

The disclosed data communications network includes a data communications ring configured for spatial reuse, such as a resilient packet ring. First and second bridges are coupled to the ring, and the first bridge is also coupled to an end station, which may be an interworking bridge, a router, or similar network device.

The second bridge learns an association between the first bridge and the end station, for example by monitoring packets originated in the network by the end station and sent on the ring by the first bridge. The second bridge also receives packets destined for the end station, for example from another end station coupled in some fashion to the second bridge. The second bridge forwards such received packets as broadcast transmissions on the ring in the event that the association between the first bridge and the destination end station has not yet been learned, and forwards the received packet as a unicast transmission to the first bridge on the ring in the event that the association between the first bridge and the destination end station has been learned.

Through the use of unicast transmission where made possible by the learning of such associations, spatial reuse of ring bandwidth is increased, resulting in overall greater usable transmission capacity in the ring than would otherwise be obtained.

Preferably, packets transmitted on a ring by a bridge include an ingress identifier and an egress identifier which identify the transmitting bridge and a destination bridge respectively. A bridge on a ring learns the association between an end station and another bridge by obtaining a source end station address and an ingress bridge identifier from received packets. The ring may be a resilient packet ring or other ring providing for fast packet transfer and spatial reuse, and may be one of multiple interconnected rings in the network.

Other aspects, features, and advantages of the present invention will be apparent from the detailed description that follows.

BRIEF DESCRIPTION OF THE SEVERAL VIEWS OF THE DRAWING

The invention will be more fully understood by reference to the following Detailed Description of the Invention in conjunction with the Drawing, of which.

DETAILED DESCRIPTION OF THE INVENTION

Figure 1:
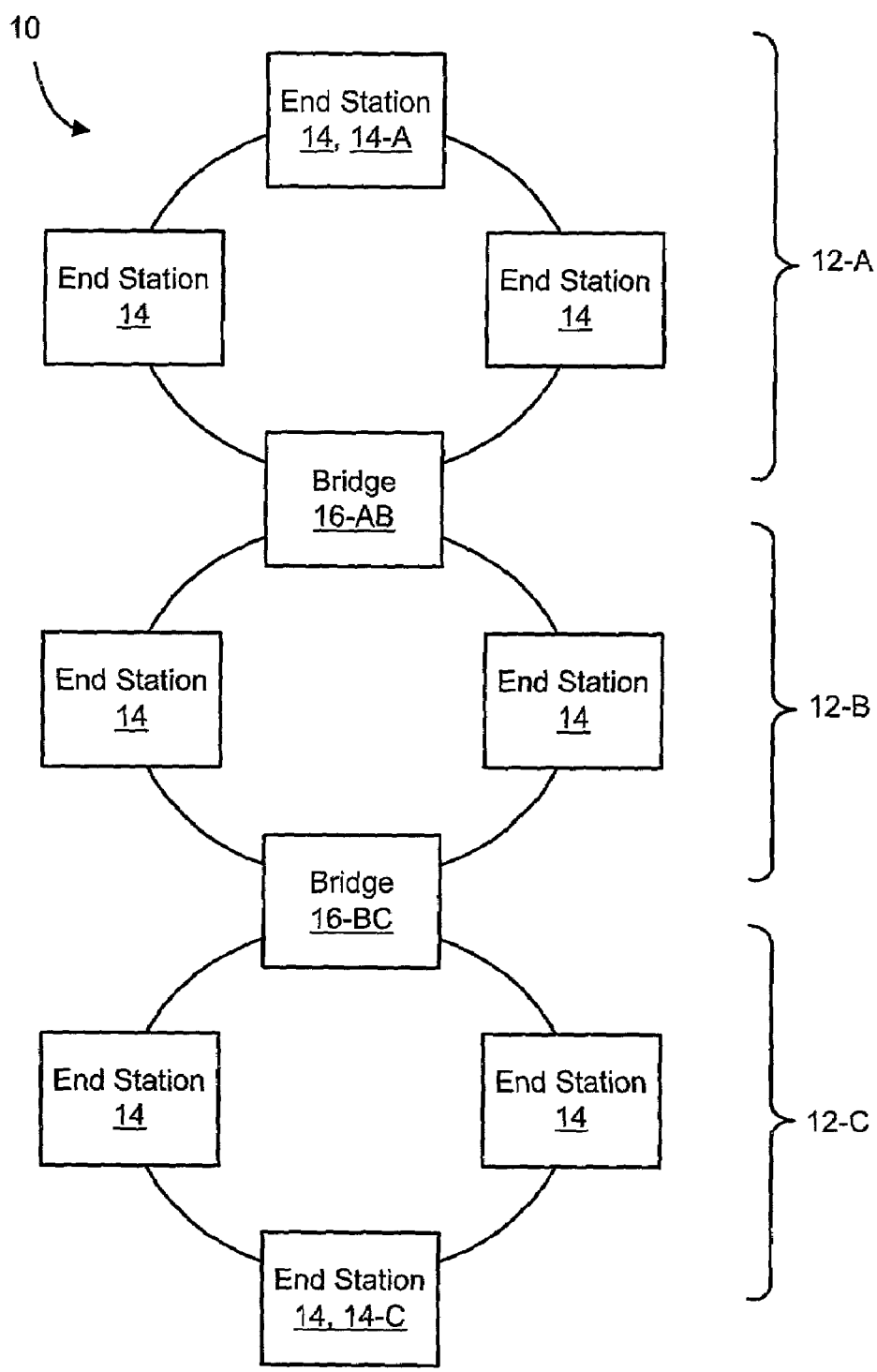
FIG. 1 is block diagram of a multi-ring network in accordance with the present invention.

FIG. 1 shows a Resilient Packet Ring (RPR) network 10 including multiple interconnected RPR rings, such as exemplary rings 12-A, 12-B and 12-C. Each ring 12 generally includes multiple RPR nodes, which in FIG. 1 are shown as RPR end stations 14 and bridges 16. The end stations 14 are the ultimate sources and destinations of RPR packets in the network 10. The end stations 14 generally include functionality at higher layers of network operation in addition to their RPR functionality. For example, the end stations 14 may include application-layer functionality such as database or Web serving, or may include lower layer functionality such as network routing. In one embodiment, at least some of the end stations 14 cooperatively provide transparent LAN services to customers connected to external LAN segments (not shown). In such an embodiment, the network 10 provides logical connections among geographically separated LAN segments to create the appearance of one or more homogeneous LANs. The participating end stations 14 encapsulate and decapsulate LAN packets into/from corresponding RPR packets for transfer across the RPR network 10, and perform related processing functions.

An RPR bridge 16 appears at each point of interconnection between two RPR rings 12, such as the RPR bridges 16-AB and 16-BC as shown. The RPR bridges 16 serve to selectively forward packets among the various rings 12, which enables the RPR network 10 to contain a larger number of nodes 14 than might be possible on a single ring. The bridges 16 also enable the use of additional interconnection topologies within the RPR network 10. For example, multiple rings 12 can be connected in a tree-like fashion or a linear fashion such as shown in FIG. 1. As described below, the RPR bridges 16 forward packets in a manner that minimizes broadcasting, so that the available data transmission capacity within the RPR network 10 is used efficiently.

Each ring 12 employs RPR packets to transport data among the attached RPR nodes. The RPR packets contain a payload portion and an RPR header that contains address and other information used in transporting the RPR packets. Each RPR ring 12 employs two transmission modes. One mode is a broadcast mode, in which a packet is originated by a source RPR node and circulated to all the other nodes on the ring until the packet returns to the source node, whereupon the packet is "stripped" or removed from the ring. The mechanics of broadcast transmission are described in more detail below. The RPR rings 12 also include a unicast transmission mode, in which a packet is originated by a source RPR node and circulated only to a specific destination RPR node as identified by a value in the RPR packet header. Each unicast packet is sent on the shortest path to the destination node and is stripped from the ring at the destination node, and therefore in general does not circulate around the entire ring. This operation results in the property of "spatial reuse" for the ring, i.e., the use for other purposes of ring bandwidth between the destination RPR node and the source RPR node that is not needed to circulate the packet back to the source node for stripping. Spatial reuse is a desirable operational feature due to the ability to make more efficient use of the available transmission capacity of a ring.

To exploit the spatial reuse capability of the RPR rings 12, the bridges 16 employ a "directed bridging" technique that uses unicast transmission where possible, reducing the need for bandwidth-wasting broadcast transmission. The directed bridging technique employs RPR packets including certain information, as shown below:

| Misc | Egress ID | Ingress ID | DA | SA | Payload |

In the above diagram, "SA" refers to the address of an end station 14 that has originated the RPR packet, and "DA" refers to the address of the end station 14 that is the intended destination of the RPR packet. It should be noted that the source and destination end stations 14 may reside on different rings 12 in the network 10. The "ingress ID" is used to identify a bridge 16 that has transmitted a packet on a ring 12 as part of its packet forwarding operations. Such a bridge is referred to as an "ingress bridge". The "egress ID" generally identifies a bridge 16 to which the packet is being transmitted for forwarding to another ring 12. Such a bridge is referred to as an "egress bridge". The egress ID may also identify the packet as a "broadcast" packet that should be forwarded by all bridges to all attached rings. The broadcast can be an 'all stations' broadcast received by all stations on the ring, or an 'all bridges' broadcast received only by those stations associated with bridges on the ring. The latter method can be used when the destination end station address is an individual address (i.e. not a group address) and it can be inferred from knowledge of the local ring topology that the destination end station is not located on the local ring. The ingress ID and egress ID enable the explicit identification of corresponding bridges as the immediate source and destination(s) of a packet on a given ring 12, while the SA and DA identify the ultimate end stations 14 for a packet throughout the RPR network 10. These fields are used in packet forwarding as described below.

Figure 2:
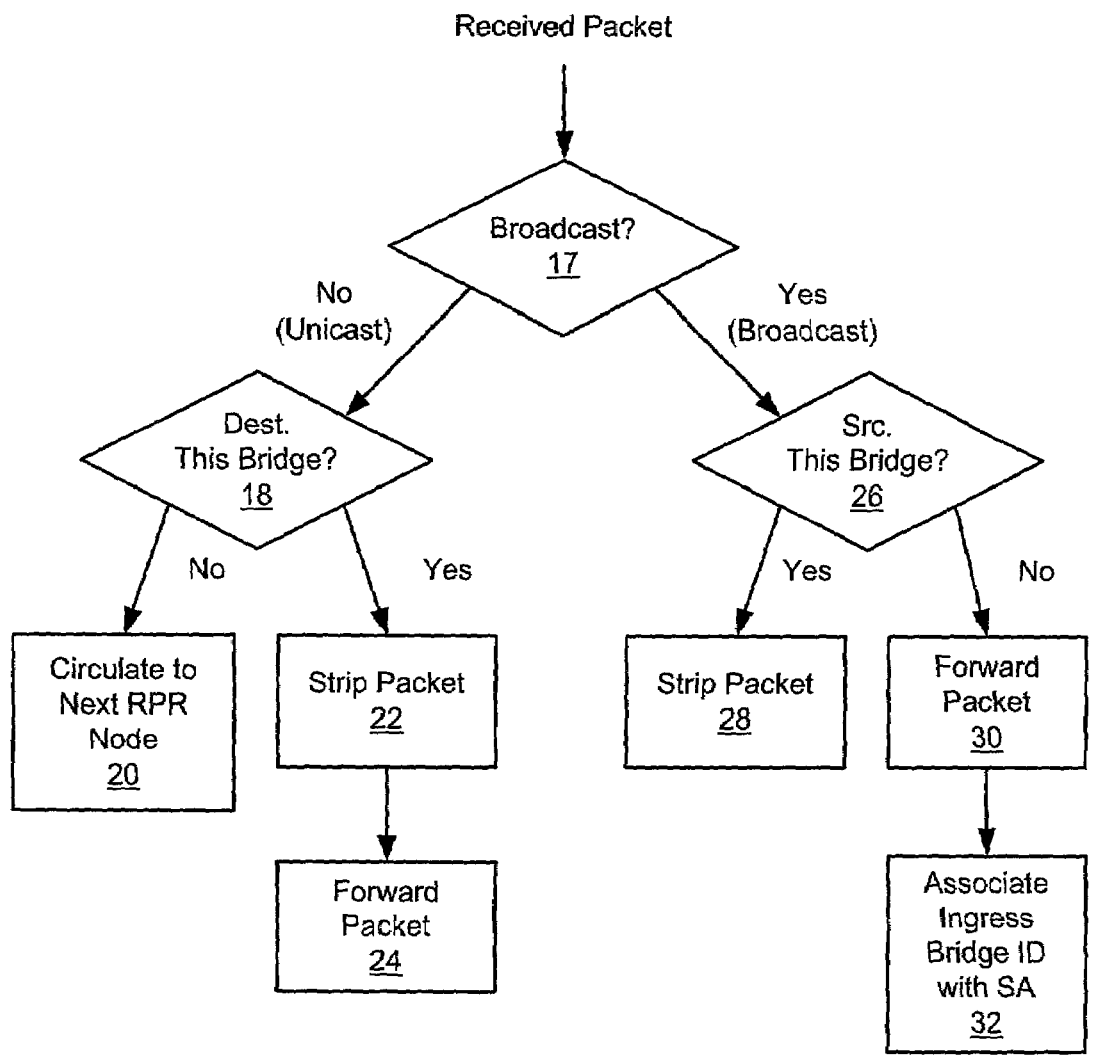
FIG. 2 is a flow diagram illustrating the processing of packets when received from a ring by a bridge in the network of FIG. 1.

FIG. 2 shows the process performed by a bridge 16 upon receiving a packet from an attached ring 12. The manner of processing depends on the transmission mode for the packet. It is determined at step 17 whether the packet is a broadcast packet, i.e., whether the packet contains a broadcast-indicating egress ID. If not, then it is further determined at step 18 whether the egress ID identifies this bridge as the specific destination for the packet. If the packet is not destined for this bridge, then at step 20 the packet is simply circulated to the next node on the ring 12 from which the packet was received. If the packet is destined for this bridge, then at step 22 the packet is stripped from the ring 12, and at step 24 the packet is forwarded to one or more other attached rings 12. The forwarding of packets is described below with reference to FIG. 3.

If at step 17 the received packet is determined to be a broadcast packet, then at step 26 it is determined from the ingress ID whether this bridge is the source of the packet. If so, then at step 28 the packet is stripped from the ring 12. If the source of the packet is not this bridge, then at step 30 the packet is forwarded to one or more other attached rings 12, as described below. Additionally, at step 32 the bridge 16 establishes an association between the ingress ID and the SA of the packet, which reflects that the end station 14 identified by the SA can be reached via the bridge 16 identified by the ingress ID. This operation is referred to as "learning" the location of the end station 14 specified by the SA, which becomes "known" at this bridge 16. An example is given below to illustrate this operation.

It should be noted that in some cases, the ingress ID may identify and end station 14, although its primary function is to identify an ingress bridge 16. An example is described below.

Figure 3:
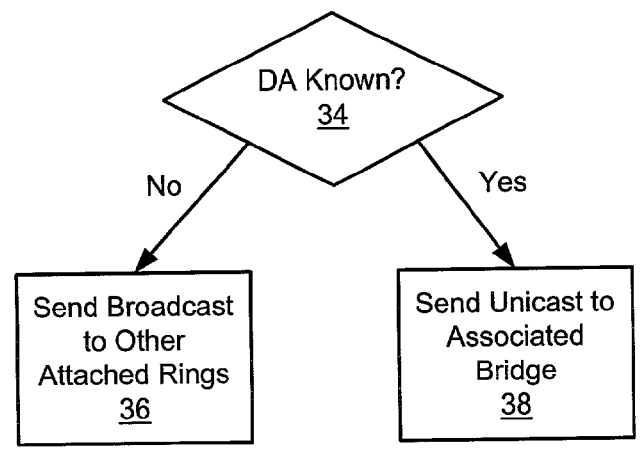
FIG. 3 is a flow diagram illustrating the forwarding of packets from a bridge in the network of FIG. 1.

FIG. 3 illustrates the forwarding of packets from a bridge 16. At step 34, the RPR bridge 16 determines whether the destination end station 14 identified by the DA is "known", i.e., has become associated with an identifier of a bridge 16 through the learning process described above with reference to FIG. 2. If the destination end station is not known, then at step 36 the packet is transmitted as a broadcast packet on all attached rings other than the ring 12 from which the packet has been received. This broadcast packet circulates completely around each such ring 12 and is eventually stripped by this bridge 16, as described above with reference to FIG. 2. If at step 34 it is determined that the destination end station 14 is known, then the packet is transmitted as a unicast packet to a specific bridge 16 on a specific attached ring 12. The bridge ID that has become associated with the DA of the packet by the above learning mechanism is used as the egress ID of the forwarded unicast packet. In this case, the packet is transmitted on only one attached ring 12, and it is transmitted in a unicast manner along the shortest path to the egress bridge 22. This operation preserves ring bandwidth for "spatial reuse" for other transmissions as described above.

As with the ingress ID and SA, in some cases the egress ID and the DA may identify the same destination end station 14.

An example is presented to illustrate the above-described operation of the network of FIG. 1. It is assumed that end station 14-A in FIG. 1 sends a packet to end station 14-C, and then end station 14-C sends a packet to end station 14-A. For ease of description, these transmissions are referred to below as "the 1->2 packet" and "the 2->1 packet" respectively. It is further assumed that no prior associations between end stations 14 and bridges 16 have been learned at any of the bridges 16.

The 1->2 packet is initially transmitted by the end station 14-A on ring 12-A. The address of the end station 14-A is included as the SA of this packet, and the address of the end station 14-C is included as the DA. The ingress ID identifies the end station 14-A, and the egress ID is set equal to the "broadcast" value, because the end station 14-A has no information indicating that the end station 14-C is reachable via any particular bridge 16.

The RPR broadcast packet circulates around the entire ring 12-A and is stripped upon receipt back at the source, i.e. at end station 14-A. During its circulation, when this packet is received at the bridge 16-AB, it is processed as described above with reference to FIGS. 2 and 3. In particular, the packet is forwarded onto ring 12-B as a broadcast packet. The SA and DA are not changed. The ingress ID is set to a value identifying the bridge 16-AB, and the egress ID is set to the broadcast value. In addition to forwarding the packet, the bridge 16-AB creates an association between the Ingress ID and the SA of the received packet, which in this case both identify the end station 14-A. As a result, the RPR address of the end station 14-A is now "known" at the bridge 16-AB.

The new RPR broadcast packet circulates around ring 12-B and is processed at bridge 16-BC in similar manner. The bridge 16-BC learns an association between the SA (which is the address of the end station 14-A) and the ingress ID (which identifies bridge 16-AB). A new RPR packet is created and circulated around ring 12-C. This packet contains the identifier of the bridge 16-BC as the ingress ID, and the SA, DA and egress ID remain the same as before. When the packet is received at end station 14-C, it is stripped from the ring 12-C and its payload is delivered to the higher-layer client entity, which as described above may be an interworking bridge, router, or even higher-layer function such as a server. Additionally, an association between the SA and the ingress ID (identifying bridge 16-BC) is learned.

When the 2->1 packet is subsequently sent in the opposite direction from end station 14-C to end station 14-A, the end station 14-C has an existing association between the DA (identifying end station 14-A) and the identifier of the bridge 16-BC, due to the learning that occurred during the transport of the 1->2 packet. Therefore, the packet created by the end station 14-C is a unicast packet whose egress ID identifies the bridge 16-BC. This packet is stripped from the ring 12-C upon receipt at the bridge 16-BC, and is circulated no further on the ring 12-C.

The processing at RPR bridges 16-BC and 16-AB is similar insofar as determining that the DA is known and forwarding the 2->1 packet in a unicast rather than broadcast manner. The bridge 16-BC has an association between the DA and the identifier of the bridge 16-AB, and therefore sends a unicast packet to the bridge 16-AB. The bridge 16-AB likewise sends the unicast packet to the end station 14-A. Additionally, the bridge 16-BC learns an association between the SA of the packet, which is the address of the end station 14-C, and the ingress ID, which also identifies the end station 14-C. Similarly, the bridge 16-AB learns an association between the SA and the identifier of the bridge 16-BC. When the packet is received at end station 14-A, it is stripped from the ring 12-A and its payload is delivered to the higher-layer client entity, as discussed above with reference to the processing of the 1->2 packet at the end station 14-C. Additionally, an association between the SA and the ingress ID (identifying bridge 16-AB) is learned. The associations learned by the bridges 16-BC and 16-AB during this forwarding of the 2->1 packet are available for subsequent use in forwarding packets from rings 12-A and 12-B to ring 12-C for delivery to end station 14-C.

Figure 4:
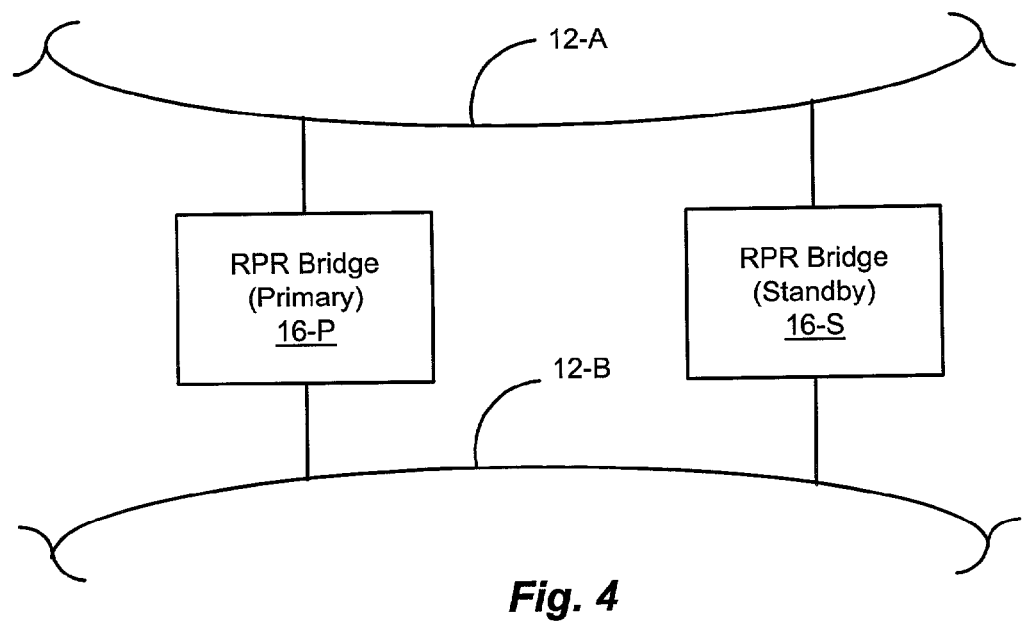
FIG. 4 is a block diagram of portion of a network employing a primary bridge and a standby bridge in accordance with the present invention.

FIG. 4 illustrates another feature of the present invention, namely the use of redundant RPR bridges 16 between a pair of rings 12 to enhance the availability of the RPR network 10. In particular, both a primary RPR bridge 16-P and an associated standby RPR bridge 16-S are connected between two RPR rings, such as rings 12-A and 12-B of FIG. 2. Both bridges 16-P and 16-S generally receive the same traffic, but only an active one of the bridges is responsible for forwarding packets between the two rings 12-A and 12-B at any given time. The primary bridge 16-P has priority as the active bridge, and therefore functions as the active bridge if it is working properly. The standby bridge 16-S operates in a standby mode when the primary bridge 16-P is active. When the primary bridge 16-P fails, the standby bridge 16-S becomes active, and assumes responsibility for forwarding packets between the two rings 12-A and 12-B.

To improve operation in the event of a switchover between the primary bridge 16-P and the standby bridge 16-S, the primary bridge 16-P transmits update messages to inform the standby bridge 16-S of new associations learned by the primary bridge 16-P during packet forwarding operation, as described above. The standby bridge 16-S uses these update messages to maintain a substantially duplicate copy of all learned associations that are maintained in the primary bridge 16-P during operation. Therefore, when a switchover occurs, any disruption in the pattern of unicast versus broadcast traffic is minimized, especially in comparison to the disruption that could occur if the standby bridge 16-S did not maintain such a duplicate copy of learned associations. The update messages can be sent on either ring 12-A or 12-B using control packets. Alternatively, there may be a separate private connection (not shown in FIG. 4) between a primary bridge 16-P and its associated standby bridge 16-S for carrying the update messages.

It will be apparent to those skilled in the art that modifications to and variations of the disclosed methods and apparatus are possible without departing from the inventive concepts disclosed herein, and therefore the invention should not be viewed as limited except to the full scope and spirit of the appended claims.

What is claimed is:

1. A data communications network, comprising:
a plurality of data communications rings, the plurality of rings including a first ring, a second ring, and a third ring,
wherein at least the second ring is configured for spatial reuse;
at least one first node coupled to the first ring, the at least one first node including a first end station, the first end station having an associated address;
at least one second node coupled to the second ring;
a first bridge configured to link the first ring to the second ring; and
a second bridge configured to link the second ring to the third ring,
wherein each of the first and second bridges has an associated identifier,
wherein the second bridge:
(1) at least one packet at least one packet, the at least one received packet including an ingress identifier, an egress identifier, and a source end station address;
analyzing the ingress identifier of the received packet to determine whether the ingress identifier corresponds to the first bridge identifier;
analyzing the source end station address of the received packet to determine whether the source end station address corresponds to the first end station address; and
in the event the ingress identifier and the source end station address of the received packet correspond to the first bridge identifier and the first end station address, respectively, learning an association between the first bridge and the first end station coupled to the first ring, and,
(2) upon receiving a packet destined for the first end station:
(i) in the event the association between the first bridge and the first end station coupled to the first ring has not yet been learned, forwarding, on the second ring, the received packet as a broadcast transmission in a manner indicating that the packet is to be examined by the first bridge and each of the at least one second node coupled to the second ring, and
(ii) in the event the association between the first bridge and the first end station coupled to the first ring has been learned, making the egress identifier of the received packet correspond to the first bridge identifier, forwarding, on the second ring, the received packet as a unicast transmission from the second bridge to the first bridge, and removing, at the first bridge, the received packet from the second ring to permit spatial reuse of the second ring.

2. A data communications network according to claim 1, wherein the first end station comprises an interworking bridge.

3. A data communications network according to claim 2, wherein the interworking bridge provides transparent LAN services via the second ring to customers connected to external LAN segments.

4. A data communications network according to claim 1, wherein the second ring is a resilient packet ring.

5. A data communications network according to claim 1, further comprising a second end station, the second end station having an associated address and being coupled to the third ring, and wherein the first bridge is operative (1) to learn an association between the second bridge and the second end station coupled to the third ring, and (2) upon receiving a packet destined for the second end station: (i) to forward, on the second ring, the received packet as a broadcast transmission between the first bridge and the second bridge in a manner indicating that the packet is to be examined by each of the at least one second node coupled to the second ring, in the event that the association between the second bridge and the second end station coupled to the third ring has not yet been learned, and (ii) to forward, on the second ring, the received packet as a unicast transmission from the first bridge to the second bridge, in the event that the association between the second bridge and the second end station coupled to the third ring has been learned.

6. A data communications network according to claim 5, wherein the first bridge learns the association between the second bridge and the second end station by monitoring the broadcast transmission of the second bridge on the second ring, the broadcast transmission of the second bridge including the second bridge identifier identifying the second bridge as an ingress bridge and the second end station address corresponding to an address of a source of a message included in the broadcast transmission of the second bridge.

7. A data communications network according to claim 5, further comprising a third bridge, the third bridge being coupled to both the second and third rings as a backup to the second bridge, and wherein the second bridge is operative to send unicast update messages to the third bridge enabling the third bridge to keep track of the associations learned by the second bridge, and wherein the third bridge is operative upon failure of the second bridge to begin the learning of associations and the forwarding of packets on the second ring as broadcast or unicast transmissions depending on whether the respective associations have been learned.

8. A method of operating a data communications network having a first end station, a plurality of data communications rings including a first ring, a second ring, and a third ring, at least the second ring being configured for spatial reuse, the first end station having an associated address and being coupled to the first ring, at least one second node being coupled to the second ring, a first bridge for linking the first ring to the second ring, and a second bridge for linking the second ring to the third ring, each of the first and second bridges having an associated identifier, the method comprising the steps of:

at the second bridge:
receiving at least one packet, the at least one received packet including an ingress identifier, an egress identifier, and a source end station address;
analyzing the ingress identifier of the received packet to determine whether the ingress identifier corresponds to the first bridge identifier;
analyzing the source end station address of the received packet to determine whether the source end station address corresponds to the first end station address;
in the event the ingress identifier and the source end station address of the received packet correspond to the first bridge identifier and the first end station address, respectively, learning an association between the first bridge and the first end station coupled to the first ring; and
upon receiving a packet destined for the first end station:
(i) in the event the association between the first bridge and the first end station coupled to the first ring has not yet been learned, forwarding, on the second ring, the received packet as a broadcast transmission in a manner indicating that the packet is to be examined by the first bridge and each of the at least one second node coupled to the second ring; and
(ii) in the event the association between the first bridge and the end station coupled to the first ring has been learned, making the egress identifier of the received packet correspond to the first bridge identifier, forwarding, on the second ring, the received packet as a unicast transmission from the second bridge to the first bridge, and removing, at the first bridge, the received packet from the second ring to permit spatial reuse of the second ring.

9. A method according to claim 8, wherein the first end station comprises an interworking bridge.

10. A method according to claim 9, wherein the interworking bridge provides transparent LAN services via the second ring to customers connected to external LAN segments.

11. A method according to claim 8, wherein the second ring is a resilient packet ring.

12. A method according to claim 8, wherein the network further includes a second end station, the second end station having an associated address and being coupled to the third ring, and further comprising:

at the first bridge, learning an association between the second bridge and the second end station coupled to the third ring; and
at the first bridge, upon receiving a packet destined for the second end station:
(i) in the event that the association between the second bridge and the second end station coupled to the third ring has not yet been learned, forwarding, on the second ring, the received packet as a broadcast transmission between the first bridge and the second bridge in a manner indicating that the packet is to be examined by each of the at least one second node coupled to the second ring; and
(ii) in the event that the association between the second bridge and the second end station coupled to the third ring has been learned, forwarding, on the second ring, the received packet as a unicast transmission from the first bridge to the second bridge.

13. A method according to claim 12, wherein the first bridge learns the association between the second bridge and the second end station by monitoring the broadcast transmission of the second bridge on the second ring, the broadcast transmission of the second bridge including the second bridge identifier identifying the second bridge as an ingress bridge and the second end station address corresponding to an address of a source of a message included in the broadcast transmission of the second bridge.

14. A method according to claim 12, wherein the network further comprises a third bridge, the third bridge being coupled to both the second and third rings as a backup to the second bridge, and further comprising:
at the second bridge, sending unicast update messages to the third bridge enabling the third bridge to keep track of the associations learned by the second bridge; and
at the third bridge, upon failure of the second bridge, beginning the learning of associations and the forwarding of packets on the second ring as broadcast or unicast transmissions depending on whether the respective associations have been learned.

* * * * *

UNITED STATES PATENT AND TRADEMARK OFFICE
CERTIFICATE OF CORRECTION

| | | |
|---|---|---|
| PATENT NO. | : 7,383,354 B2 | Page 1 of 1 |
| APPLICATION NO. | : 10/074600 | |
| DATED | : June 3, 2008 | |
| INVENTOR(S) | : Robert Sultan et al. | |

It is certified that error appears in the above-identified patent and that said Letters Patent is hereby corrected as shown below:

Column 7, claim 1, line 41 "(1) at least one packet at least one packet," should read --(1) receiving at least one packet,--.

Signed and Sealed this

First Day of September, 2009

David J. Kappos
*Director of the United States Patent and Trademark Office*